(12) United States Patent
Davenport (10) Patent No.: US 10,524,428 B2
(45) Date of Patent: Jan. 7, 2020

(54) TREE SEGREGATION AND PROTECTION SYSTEM

(71) Applicant: Natalie Lorene Davenport, Neosho, MO (US)

(72) Inventor: Natalie Lorene Davenport, Neosho, MO (US)

(73) Assignee: RN Holdings, LLC, Neosho, MO (US)

( * ) Notice: Subject to any disclaimer, the term of this patent is extended or adjusted under 35 U.S.C. 154(b) by 147 days.

(21) Appl. No.: 14/767,433

(22) PCT Filed: Feb. 12, 2014

(86) PCT No.: PCT/US2014/016043
§ 371 (c)(1),
(2) Date: Aug. 12, 2015

(87) PCT Pub. No.: WO2014/127011
PCT Pub. Date: Aug. 21, 2014

(65) Prior Publication Data
US 2015/0373929 A1 Dec. 31, 2015

Related U.S. Application Data

(60) Provisional application No. 61/763,600, filed on Feb. 12, 2013.

(51) Int. Cl.
*A01G 13/10* (2006.01)
(52) U.S. Cl.
CPC .................. *A01G 13/105* (2013.01)
(58) Field of Classification Search
CPC .............. A01G 13/105; A01G 13/0237; A01G 13/0281; A01G 13/0256
USPC .......... 47/32.4, 32.6, 29.5, 29.7, 31, 31.1, 32
See application file for complete search history.

(56) References Cited

U.S. PATENT DOCUMENTS

| | | | | | |
|---|---|---|---|---|---|
| 219,987 | A | * | 9/1879 | Scott ................. | A01G 13/0243 47/32.4 |
| 602,941 | A | * | 4/1898 | Harvey .............. | A01G 13/0243 47/31 |
| 897,760 | A | * | 9/1908 | Martin ................ | A01G 13/04 47/29.5 |
| 1,453,810 | A | * | 5/1923 | Sleen ................. | A01G 13/0281 47/31 |
| 3,571,972 | A | * | 3/1971 | Carter, Jr. .......... | E01F 15/0469 47/30 |
| 3,940,884 | A | * | 3/1976 | Mason, Jr. ........... | A01G 9/00 47/32 |
| 4,062,145 | A | * | 12/1977 | Gidge ............... | A01G 13/0262 156/243 |
| 4,977,703 | A | * | 12/1990 | Blanc ................ | A01G 13/0281 47/30 |
| 4,986,025 | A | * | 1/1991 | Imperial ............ | A01G 13/0281 47/2 |

(Continued)

FOREIGN PATENT DOCUMENTS

CN 202960008 6/2013

*Primary Examiner* — Monica L Williams
(74) *Attorney, Agent, or Firm* — Bay State IP, LLC (57) ABSTRACT

A protective and decorative system for trees, particularly holiday or Christmas trees, which segregates portions of the tree for safety reasons, by utilization of concentric ring mechanisms and a backing section. The versatile system includes fire retardant capabilities and includes demarcations on is fitted to any size of tree for ease of installation.

12 Claims, 5 Drawing Sheets

(56) References Cited

U.S. PATENT DOCUMENTS

| | | | | |
|---|---|---|---|---|
| 5,003,724 A | * | 4/1991 | Vestuti | E01F 15/0469 47/31.1 |
| 5,085,001 A | * | 2/1992 | Crawley | A01G 13/0281 47/30 |
| 5,184,421 A | * | 2/1993 | Meharg | A01G 13/0212 47/21.1 |
| 5,355,623 A | * | 10/1994 | Brown | A01G 13/0281 47/32 |
| 5,522,176 A | * | 6/1996 | Suttle | A01G 13/0281 47/32 |
| 5,711,106 A | * | 1/1998 | Ellis | A01G 13/0281 47/30 |
| 5,893,547 A | | 4/1999 | Cohen, Jr. | |
| 6,401,385 B1 | | 6/2002 | Kleinert | |
| 6,705,044 B2 | * | 3/2004 | Clancey | A01G 13/0281 47/31.1 |
| 2002/0189161 A1 | | 12/2002 | Rice | |
| 2007/0130825 A1 | * | 6/2007 | Stearns | A01G 13/0281 47/31.1 |
| 2008/0072481 A1 | * | 3/2008 | Conrad | A01G 13/0281 47/31.1 |
| 2008/0134574 A1 | * | 6/2008 | Zimmer | A01G 13/0281 47/31 |
| 2008/0256855 A1 | * | 10/2008 | Helmy | A01G 13/0281 47/33 |
| 2009/0199467 A1 | | 8/2009 | Reed | |
| 2010/0108851 A1 | | 5/2010 | Jordan | |
| 2011/0209403 A1 | | 9/2011 | Gallo | |
| 2012/0159843 A1 | * | 6/2012 | Whitcomb | A01G 13/0281 47/21.1 |

* cited by examiner

TREE SEGREGATION AND PROTECTION SYSTEM

CROSS REFERENCE TO RELATED APPLICATION

This application is for entry into the U.S. National Phase under § 371 for International Application No. PCT/US2014/016043 having an international filing date of Feb. 12, 2014, and from which priority is claimed under all applicable sections of Title 35 of the United States Code including, but not limited to, Sections 120, 363, and 365 (c), and which in turn claims priority under 35 USC 119 to United States Provisional Patent Application No. 61/763,600 filed on Feb. 12, 2013.

BACKGROUND OF THE SYSTEM

1. Field of the System

The system generally relates to protective and decorative accessories for trees, and more particularly, to accessories that may be attached to a tree, specifically for segregating portions of a Christmas tree for safety reasons.

2. Description of Concurrent Art

Trees are utilized in cultures all over the world for representation of holidays. Particularly, Christmas is a special holiday and time of the year wherein many cultures utilize a tree as a mechanism to typify the festive scene. As the holidays approach, work winds down, and people find more time to settle down and enjoy time with their family and thus gather around the tree at parties, on Christmas Eve and on Christmas Day.

Whether real or plastic, Christmas trees can be decorated with ornaments, electric lights, garland, mistletoe, and poinsettia flowers. The resulting sight is one to behold, and families will often sit around their Christmas tree and enjoy its presence.

Many families that celebrate Christmas also have pets. Many common pets, such as house dogs and house cats are naturally curious being. A favorite activity for such pets, particularly felines, is to climb, whether up a curtain, onto a chair, or even into a Christmas tree. Though incredibly cute, this last climbing destination is fraught with danger. Cats may knock down ornaments, or even the entire tree, perhaps accidentally, though more likely intentionally. Falling ornaments may break, requiring replacement, but often a cherished glass Christmas ornament may be irreplaceable. Additionally, broken shards from ornaments can present a sharp danger to both the pet and to its owners.

The tree itself may also present dangers to the pet. If the tree is real, tar seeping from the wood can be toxic. Swallowed pine needles can cause intestinal problems or puncture the tender flesh of the pet's mouth. Pets may drink the water for the Christmas tree, and accidentally ingest life extending agents or aspirin present in the water. Both mistletoe and poinsettia flowers, commonly used as tree decorations, are poisonous. A collar may get caught on a branch, trapping the pet until its owners can come to the rescue. Often pet owners will allow their pets to climb the tree, both parties wholly unaware of these dangers.

Pets and Christmas trees can also present dangers that threaten all of the members of the household. For example, a common cause of fires during the Christmas season is malfunctions by Christmas tree lights. Pets that chew, claw, or get caught on electric light wires may inadvertently electrocute themselves, or start a fire. Many deaths and losses of homes are caused each year by fires originating from Christmas trees.

In the past, people aware of these dangers have resorted to placing the Christmas tree in a separate closed room, so that they can control access to the tree by the pet. Unfortunately, this action may defeat the purpose of having a Christmas tree, since locking it away would prevent further enjoyment by the family. Another option is to place baby gates around the tree. Though this option may deter the loyal and trustworthy dog, it is seen as only a challenge by the cat.

SUMMARY OF THE SYSTEM

The system results, in one example, from the realization that the problems of pets climbing into Christmas trees is solved by a plate that sits beneath the lowest branches of the tree, but above the floor, and extends in proximity, but not flush with the edges of the branches, so as to be substantially hidden by the extent of the outer edges of the branches. In this way, pets underneath the tree will encounter the plate, and not be able to climb up and into the tree. As the pets cannot get up into the tree, they will not be able to injure themselves, break ornaments, or create dangers for members of the household.

Therefore, it is an object of the present system to provide a system that prevents pets from climbing Christmas trees, holiday trees or any other relevant structure.

It is another object of the present system to prevent pets from endangering themselves and others by climbing Christmas trees and thus to protect priceless ornaments decorating Christmas trees.

It is a further object of the present system to provide a plate that is easily attached to the underside of a tree and also to help prevent fires caused by Christmas trees.

It is yet another object of the present system to catch falling objects and other matter from a Christmas tree.

It is yet another object of the present system to increase enjoyment of the Christmas season by reducing stresses associated with pets and Christmas trees.

It is an additional object of the present system to provide a system, be it a planar apparatus or a plate that prevents pets from climbing Christmas trees.

It is an additional object of the present system to introduce a fire retardant system comprising a mesh backing mechanism, which can be constructed from wire. The system may utilize wire constructed from any and all forms of metals (including but not limited to malleable aluminum), polymers and coated polymers (malleable and static), and composites.

It is ancillary object and benefit of the instant system to trap twigs, branch parts or debris that might fall onto children or animals, or even into a water sump utilized for feeding the tree. Along these lines, in further embodiment, the system may be employed for numerous different trees and such, to protect form large falling debris, such as acorns or coconuts and the like. Thus, a user may employ the versatile apparatus to protect the family at a picnic or even protect a vehicle in the drive way or at a beach.

In an additional embodiment, the system may be created in a malleable material, such as a polymer, and thus can be placed within a roll, or tubular member, for ease of sale, transport and storage.

Additionally, the apparatus may be employed to protect any produce in different trees or even to protect endangered species that live in trees from big cats or animals that climb for prey. Along these protective lines, the system could be utilized to protect of other trees, particularly younger, growing trees from debris from older, larger trees.

An additional embodiment and benefit would be to segregate the growing areas of trees, where fruit and vegetables such pecans, apples or oranges reside, in order to prevent animals, such as squirrels from climbing the trees and eating the wares.

In an ancillary benefit of the protection application, the instant arrangement may be utilized to assist a worker to pick fruit or clean trees, as the worker may utilize the system for support. Additionally, for both decorative and functional purposes, the instant system may comprise a lighting component. This may utilized to illuminate the area for workers or to decorate the given tree.

There has thus been outlined, rather broadly, the more important features of the embodiments in order that the detailed description thereof that follows may be better understood, and in order that the present contribution to the art may be better appreciated. There are additional features of the system that will be described hereinafter and which will form the subject matter of the claims appended hereto.

In this respect, before explaining at least one embodiment of the system in detail, it is to be understood that the system is not limited in its application to the details of construction and to the arrangements of the components set forth in the following description or illustrated in the drawings. The system is capable of other embodiments and of being practiced and carried out in various ways. Also, it is to be understood that the phraseology and terminology employed herein are for the purpose of description and should not be regarded as limiting.

These together with other objects of the system, along with various features of novelty, which characterize the system, are pointed out with particularity in the claims annexed to and forming a part of this disclosure. For a better understanding of the system, its operating advantages and the specific objects attained by its uses, reference should be made to the accompanying drawings and descriptive matter in which there are illustrated preferred embodiments of the system.

To the accomplishment of the foregoing and related ends, certain illustrative aspects are described herein and these aspects are indicative of the various ways in which the principles disclosed herein can be practiced and all aspects and equivalents thereof are intended to be within the scope of the claimed subject matter.

BRIEF DESCRIPTION OF THE DRAWINGS

Advantages of the present apparatus will be apparent from the following detailed description of exemplary embodiments thereof, which description should be considered in conjunction with the accompanying drawings, in which: Having thus described the system in general terms, reference will now be made to the accompanying drawings, which are not necessarily drawn to scale, and wherein.

DETAILED DESCRIPTION OF THE EMBODIMENTS

The detailed description set forth below in connection with the appended drawings is intended as a description of presently preferred embodiments of the system and does not represent the only forms in which the present system may be constructed and/or utilized. The description sets forth the functions and the sequence of steps for constructing and operating the system in connection with the illustrated embodiments. However, it is to be understood that the same or equivalent functions and sequences may be accomplished by different embodiments that are also intended to be encompassed within the spirit and scope of the system, such as protective plates of different sizes, different colors, different dimensions, and construction materials.

Figure 1:
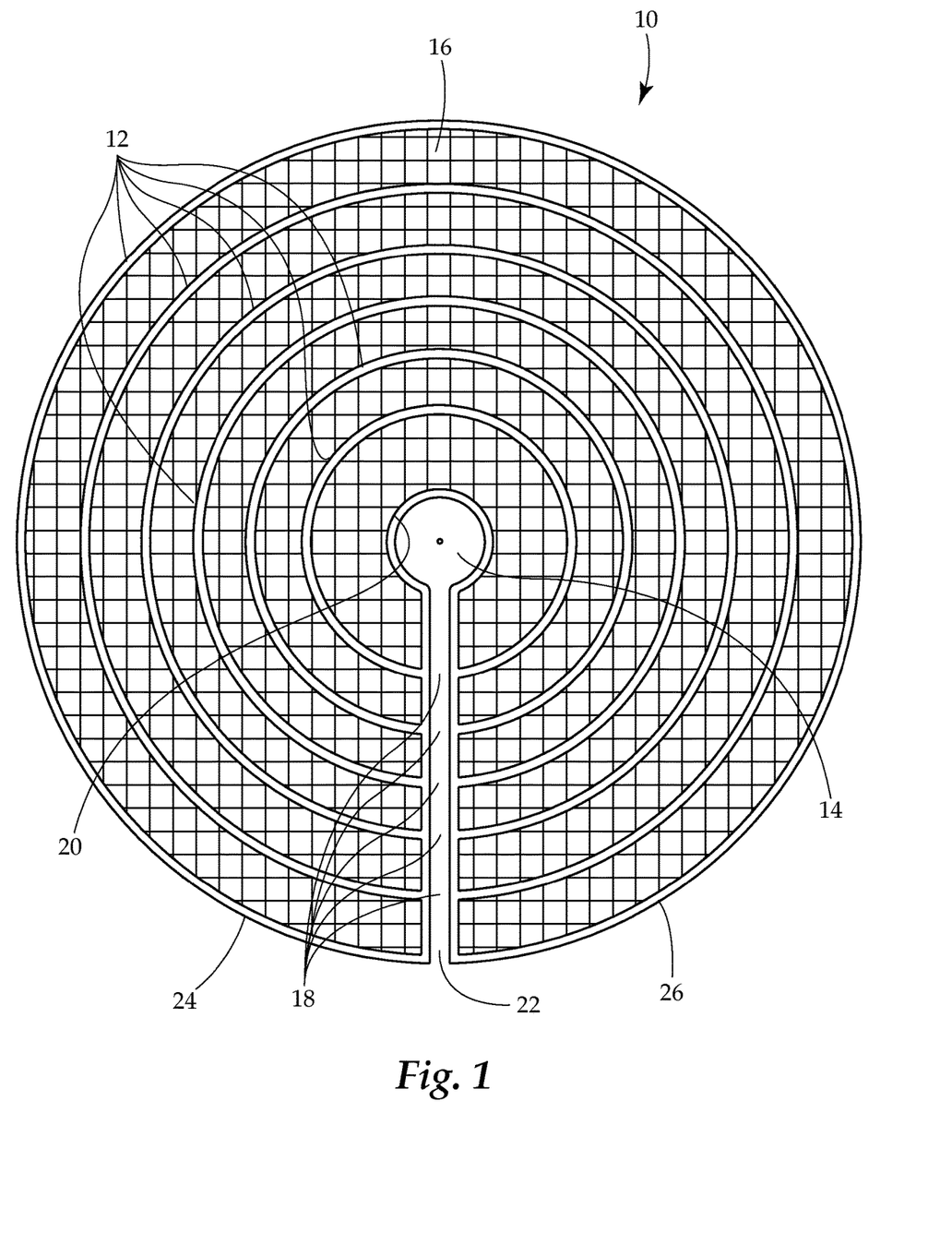
FIG. 1 is a top view of an embodiment of the instant system.
Figure 2:
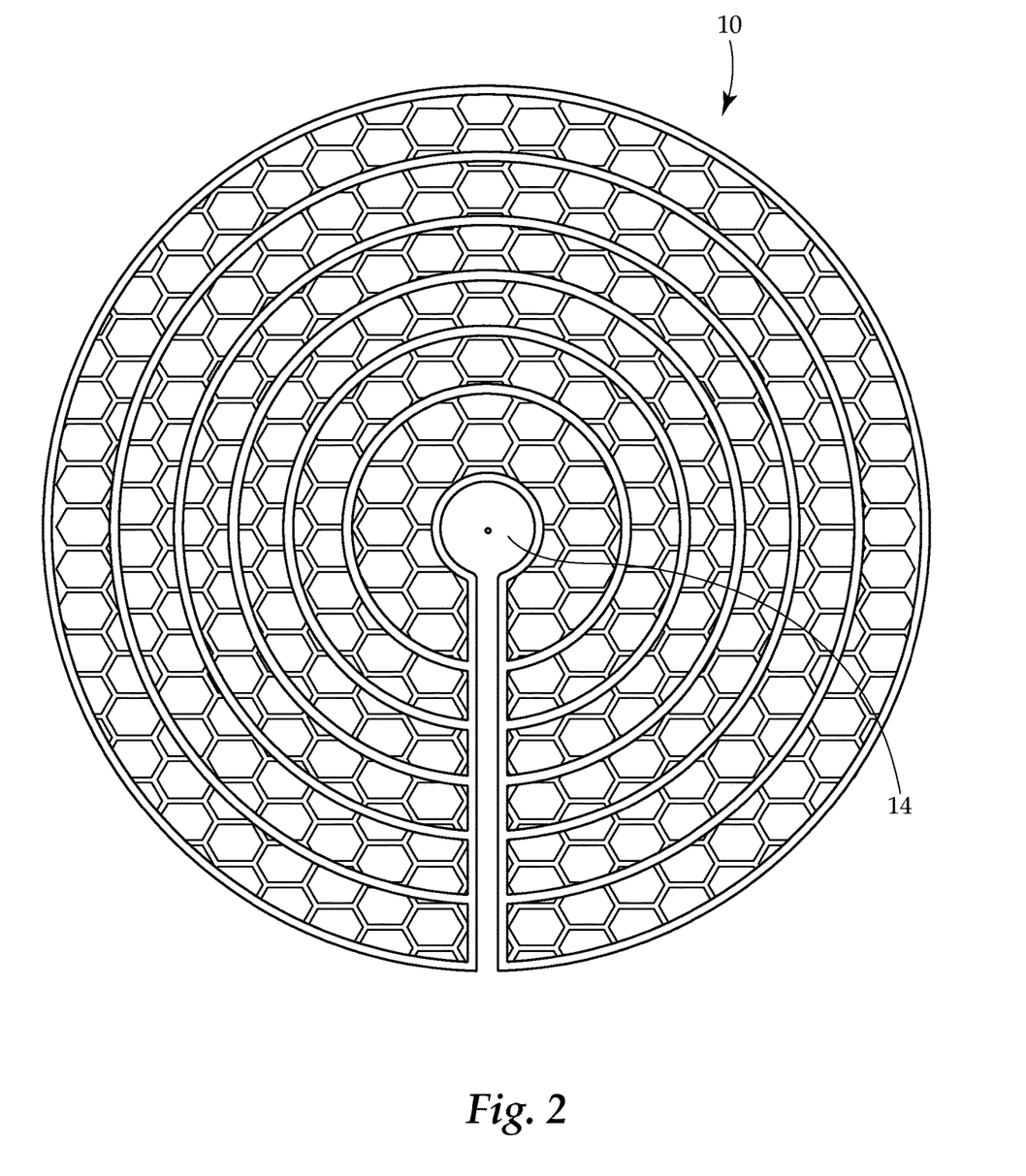
FIG. 2 is a top view of an embodiment of the present system.

Referring to FIGS. 1 and 2, an embodiment of the present system is presented. A protective plate 10 is composed of a series of concentric rings 12, increasing in diameter from the center 14. The rings are preferably composed of a stiff, yet bendable material, such as copper, aluminum wire, flame retardant semi malleable polymer, flame retardant rigid polymer, or composite. Attached to the concentric rings 12 is a mesh backing 16. The mesh backing 16 may comprise a variety of designs (compare FIGS. 1 and 2). In this embodiment, the combination of the concentric rings 12 and mesh backing 16 creates the plate 10.

To allow for attachment of the plate to a Christmas tree, each concentric ring 12 has an opening 18. The openings 18 line up at the same position along the axis of the plate 10. The opening of the center ring 20 extends along said axis, connecting all of the openings 18 together, creating a channel 22. The flexibility of the mesh 16 and rings 12 allows the plate 10 to be gripped such that the channel 22 can increase or decrease in size as the sides 24 26 of the plate 10 opposite the channels are urged away or together.

Figure 3A:
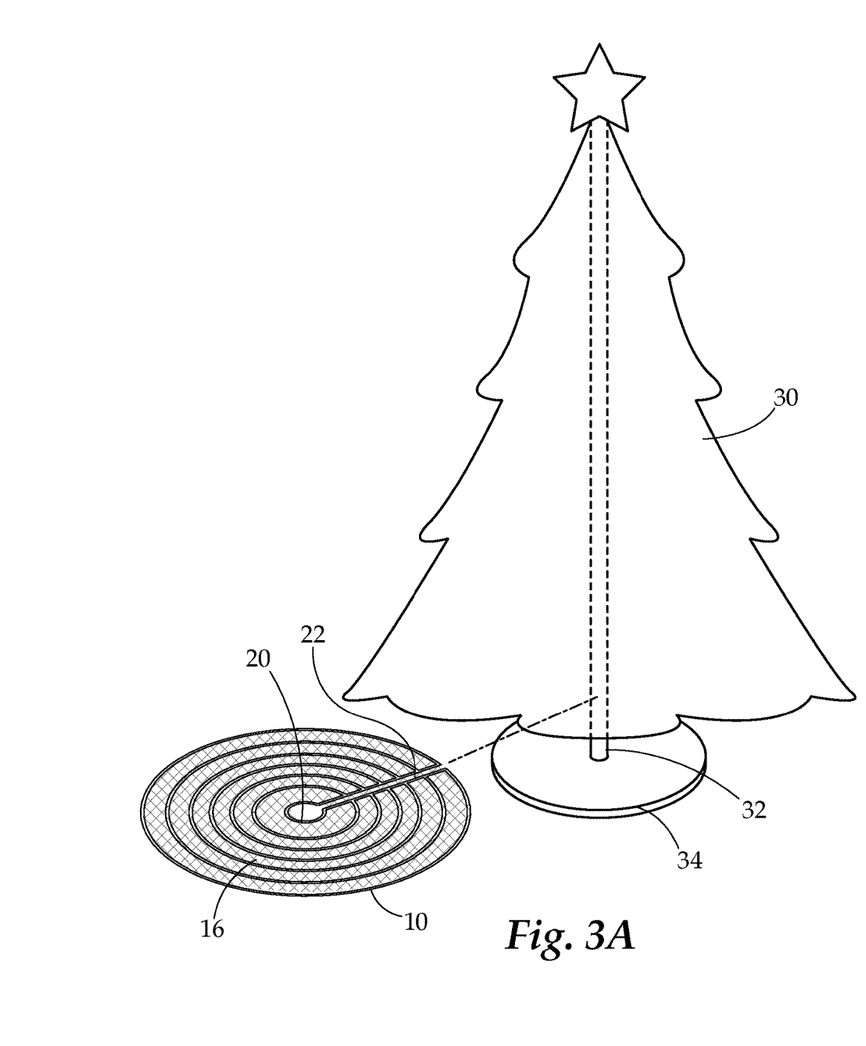
FIG. 3A is a side view of the use of one embodiment of the present system.
Figure 3B:
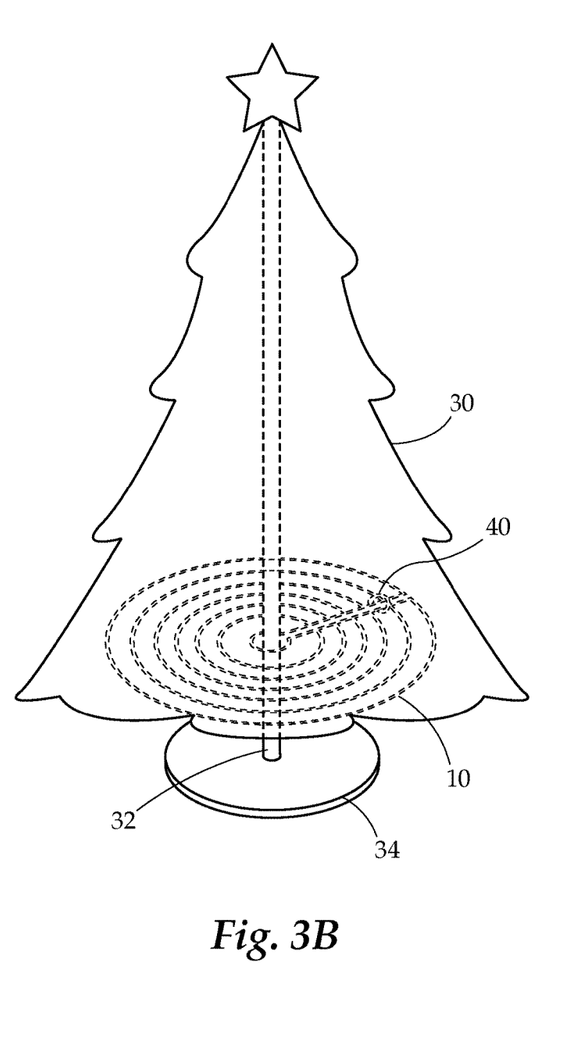
FIG. 3B is a side view of the use of one embodiment of the present system.

FIGS. 3A and 3B illustrate the use of an embodiment of the present system. In this embodiment, a family has a decorated Christmas tree 30, with a trunk 32 held in place by a stand 34. First, the channel 22 of the plate 10 is aligned with the trunk 32, preferably above at least one branch to provide support for the plate once attached. The plate 10 is then pushed forward towards the tree 30 such that the trunk 32 of the tree passes through the channel 22 and to the center ring 20. The center ring 20 has a diameter slightly larger than the trunk of most Christmas trees, so the trunk 32 should fit snugly within. The plate 10 can then be located directly below the lowest layer of branches for camouflage purposes or above a layer or two layers for support of the apparatus.

Once attached, the plate 10 prevents pets from climbing the tree from underneath. As an additional benefit, the plate 10 also collects any ornaments that fall from the tree, along with other detritus such as pine needles, bark, or small branches. These items can be removed and discarded by removing the plate 10, keeping the floor beneath the tree 30 clean.

Figures 4, 5:
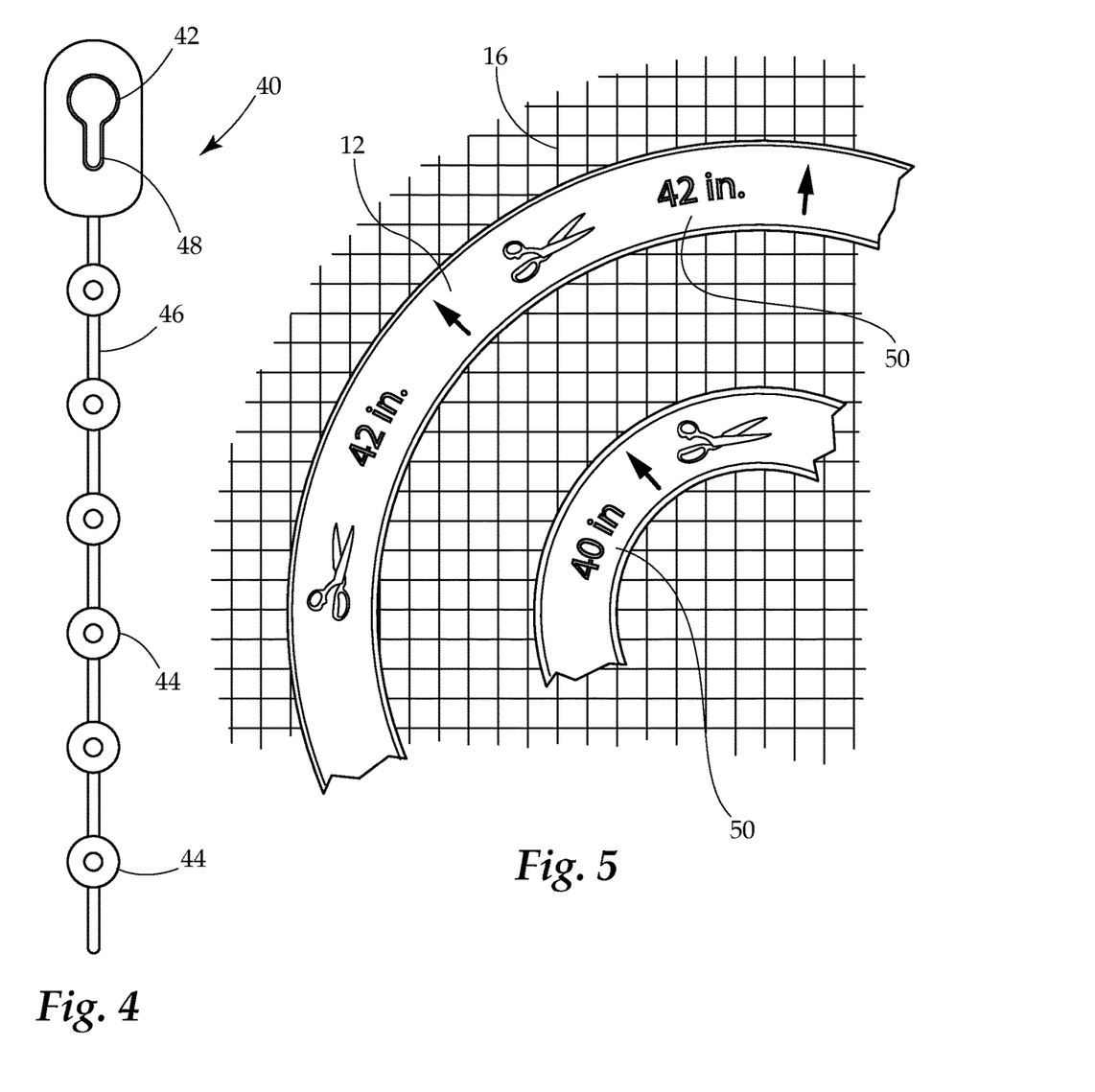
FIG. 4 is a top view of one component of an embodiment of the present system.
FIG. 5 is a zoomed top view of an embodiment of the present system.

Referring to FIG. 4, one feature of an embodiment of the present system is presented. A latch 40 includes a string 46 with a series of beads 44 placed at equal intervals. At the end of the string 46 is attached a keyhole 42, which includes a slotted portion 48. The diameter of the keyhole 42 is slightly larger than the diameter of the beads 44. In use, once a plate 10 has been attached to a tree 30 (see FIGS. 3A and 3B), it can be further secured by threading the string 46 through the mesh backing 16 opposite each side of the channel 22 of the plate 30. The beads 44 are then pulled through the keyhole 48, and when the desired tightness is achieved, the string 46 is secured within the slotted portion 48. Thus, the plate 10 is held in place tightly around the trunk 32.

Referring to FIG. 5, another feature of an embodiment of the present system is presented. As tree sizes vary, one embodiment of the present system can be trimmed to accommodate any size tree. Focusing on a single ring 12, an emblem 50 indicates the circumference of that ring. By cutting the mesh away along that portion of the ring 12, the circumference of the entire plate will equal the circumference of that ring. One could also cut the ring to a circumference slightly smaller or larger than that of the tree, so as to either hide the plate 10 from view, or to expand it to catch more items and improve its performance as a pet deterrent.

It should be noted that the system is not limited by the present embodiments. For example, in another embodiment, a single flexible sheet of material could be substituted for both the concentric rings 12 and mesh backing 16. In another embodiment, the plate 10 could be secured with a different attachment means other than the latch 40, or the attachment means could be attached to the plate.

Figure 6A:
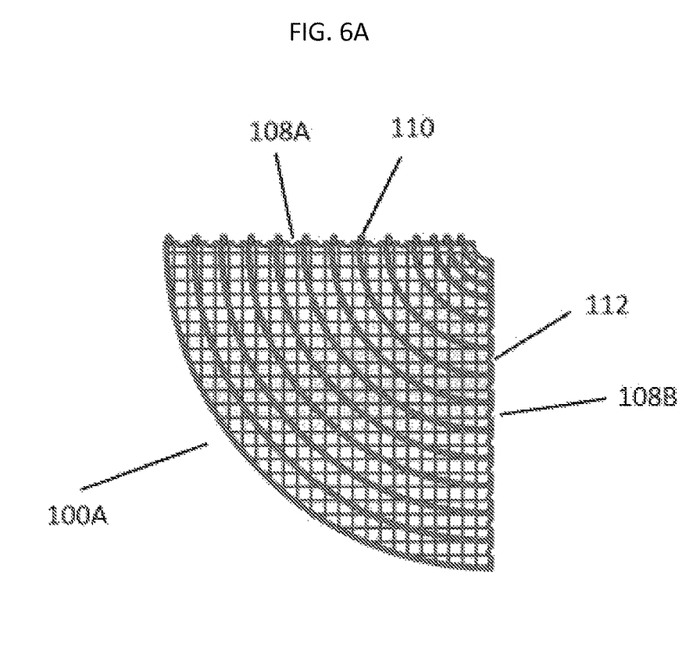
FIGS. 6A-6B are top views of an alternate embodiment of the present system.
Figure 6B:
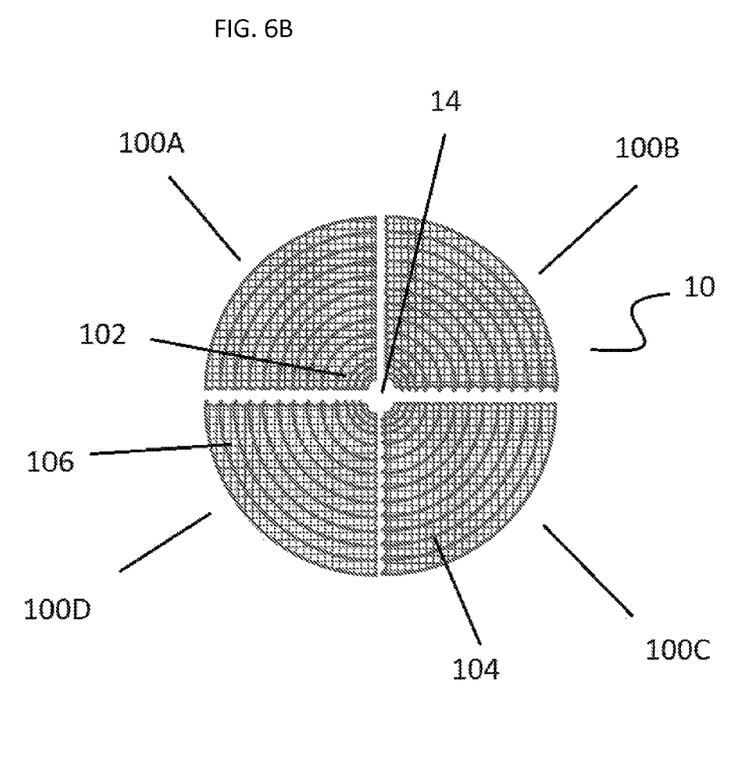

Referring to FIGS. 6A-6B, an alternate embodiment of the present system is presented. In this embodiment, the present system is shown preferably as four separate yet identical protective elements 100A, 100B, 100C and 100D, to form the protective plate 10 referenced above upon joining and assembly of the separate elements 100A-100D. In this embodiment, each protective element 100A-100D essentially forms one quarter of the protective plate 10, wherein each protective element 100A-100D contains a series of inner concentric rings 102 evenly spaced apart and starting from the center 14 of the protective plate. Furthermore, each protective element 100A-100D contains a series of outer concentric rings 104, wherein the outer concentric rings are evenly spaced apart, however at a greater distance than the separation of the inner concentric rings. In this embodiment, a mesh backing 106 is attached to the inner concentric rings 102 and outer concentric rings 104. Additionally, each protective element 100A-100D includes a first edge 108A, wherein the first edge 108A comprises a series of snap elements 110 disposed along the first edge 108A. Moreover, each protective element 100A-100D includes a second edge 108B, wherein the second edge 108B comprises a series of receiving elements 112 such that the receiving elements 112 are able to interlock with the snap elements 110 of a corresponding protective element 100A-100D thereby creating the protective plate 10.

The inner concentric rings 102 and outer concentric rings 104 are preferably composed of a stiff, yet bendable material, such as copper, aluminum wire, flame retardant semi malleable polymer, flame retardant rigid polymer, or composite. The mesh backing 16 may comprise a variety of designs (see FIGS. 1 and 2). In this embodiment, the combination of the concentric rings 102 and 104 and mesh backing 106 creates the plate 10.

To allow for attachment of the plate to a Christmas tree, each concentric ring 100A-100D has an opening. The openings line up at the same position along the axis of the plate. The opening of the center ring extends along said axis, connecting all of the openings together, creating a channel. The flexibility of the mesh 16 and rings 100A-100D allows the plate 10 to be gripped such that the channel can increase or decrease in size of the plate 10 opposite the channels are urged away or together.

In this embodiment, when the protection system is fitted together with the snaps openings, it will be created so that it can snap around wires thus will make easier to install if a consumer is using Christmas lights.

In one embodiment, the protective apparatus for a lower portion of a tree comprising: a substantially planar member; a centrally disposed aperture within the substantially planar member wherein the opening at the center; and an open channel along an axis of the substantially planar member.

The protective apparatus may further comprise two or more concentric mechanisms, each having an opening corresponding with the open channel and the shape of the two or more concentric mechanisms is selected from the group consisting of substantially circular, substantially rectangular, substantially triangular. Additionally, the substantially planar member may comprise a descending structure, in conical manner.

The protective apparatus may also comprise as many concentric ring mechanisms, including from two concentric ring mechanisms up to seven, ten or even twenty concentric ring mechanisms. The concentric ring mechanisms may also comprise demarcations for differing diameters, as mentioned above.

In an additional embodiment, the instant apparatus may comprise a process for securing a protective apparatus for a lower portion of a tree comprising the steps of placing the opening of the at least one concentric ring towards the trunk of the tree, moving the apparatus toward the trunk of the tree such that the trunk fits within the inner most of the at least one concentric ring and securing the apparatus via a slotted tying mechanism.

In a further embodiment, the instant system may comprise an apparatus for segregating the lower portion of a tree which may comprise a set of concentric ring mechanisms each having an opening and a backing material which links the set of concentric ring mechanisms, wherein the concentric ring located at the center of the plate is fitted to the trunk of the tree and engulfs the trunk of the tree.

Additionally, in the instant embodiment, the backing material attached to the set of concentric ring mechanisms comprises a mesh construction or even comprises a cross hatch construction. Also, the shape of the set of concentric ring mechanisms is selected from the group consisting of substantially circular, substantially rectangular, substantially triangular. Furthermore, in this embodiment, the apparatus for segregating the lower portion of a tree comprises a descending structure which may also be a substantially conical structure.

Moreover, the apparatus for segregating the lower portion of a tree may comprise a range between two concentric ring mechanisms and seven concentric ring mechanisms, or even up to ten or more concentric ring mechanisms, dependent upon the size of the tree and the protection needs. And, the set of concentric ring mechanisms may comprise demarcations for differing diameters. In the instant embodiment, the apparatus for segregating the lower portion of a tree may finally comprise a tying, latching or locking mechanism, which may comprise a ratcheting type mechanism for securing.

In an additional embodiment, a method for segregating the lower surface of a tree is revealed and this method may comprise the steps of measuring the diameter of the trunk of the tree, cutting a tree segregation apparatus at the diameter which most nearly corresponds with the diameter of the trunk of the tree, fitting the tree segregation apparatus at the applicable marked diameter of the trunk of the tree via an open channel in the cutting a tree segregation apparatus, and securing the outermost portion of the tree segregation apparatus with a strapping mechanism.

In an additional embodiment, the apparatus for segregating the lower portion of a tree may range in flexibility from greater flexibility at the portion nearest the tree trunk to a more taught less flexible posture at the outer reaches.

In conclusion, herein is presented a device for preventing pets from climbing into a Christmas tree. The system is illustrated by example in the drawing figures, and throughout the written description. It should be understood that numerous variations are possible, while adhering to the inventive concept. Such variations are contemplated as being a part of the present system.

What is claimed is:

1. A protective apparatus configured for use with a lower portion of a tree comprising:
    four protective elements, wherein each protective element forms a quarter of a protective plate, and wherein each protective element further comprises:
        a series of inner concentric rings increasing in diameter from a center of the protective apparatus;
        a series of outer concentric rings;
        a first edge, wherein the first edge comprises a series of snap elements disposed along the first edge; and a
        a second edge, wherein the second edge comprises a series of receiving elements; and
    a latch, wherein the latch comprises a string with a series of beads placed at equal intervals and is attached to a keyhole which includes a slotted portion;
    wherein once the protective apparatus has been placed around a tree, the latch further secures the protective apparatus;
    wherein the concentric rings are composed of a stiff, yet bendable material selected from the group consisting of: copper, aluminum wire, flame retardant semi-malleable polymer, and flame retardant rigid polymer.

2. A method for segregating the lower surface of a tree, utilizing the protective apparatus of claim 1, comprising the steps of:
    measuring the diameter of the trunk of the tree;
    cutting a tree segregation apparatus at the diameter which most nearly corresponds with the diameter of the trunk of the tree;
    fitting the tree segregation apparatus at the applicable marked diameter of the trunk of the tree via an open channel in the cutting a tree segregation apparatus; and,
    securing the outermost portion of the tree segregation apparatus with a latch mechanism.

3. The protective apparatus for a lower portion of a tree of claim 1, wherein the receiving elements are able to interlock with the snap elements of a corresponding protective element thereby creating the protective plate.

4. The protective apparatus for a lower portion of a tree of claim 1, wherein the series of inner concentric rings are evenly spaced apart starting from a center of the protective plate.

5. The protective apparatus for a lower portion of a tree of claim 4, wherein the series of outer concentric rings are evenly spaced apart, however at a greater distance than the separation of the inner concentric rings.

6. The protective apparatus for a lower portion of a tree of claim 1 wherein the series of inner concentric rings comprises at least two concentric rings and the series of outer concentric rings comprises at least two concentric rings.

7. The protective apparatus for a lower portion of a tree of claim 1 wherein the shape of the series of inner and outer concentric is selected from the group consisting of substantially circular, and substantially rectangular.

8. The protective apparatus for a lower portion of a tree of claim 1 further comprising a substantially planar member.

9. The protective apparatus for a lower portion of a tree of claim 1 wherein the series of inner concentric rings and the series of outer concentric rings comprise a range between two concentric rings and seven concentric rings.

10. The protective apparatus for a lower portion of a tree of claim 1 wherein the series of both inner and outer concentric rings comprise demarcations for differing diameters.

11. The protective apparatus for a lower portion of a tree of claim 1 further comprising a backing material, wherein the backing material attaches to the series of inner and outer concentric rings comprises a mesh construction.

12. The protective apparatus for a lower portion of a tree of claim 11 wherein the backing material attaches to the series of inner and outer concentric rings and further comprises a cross hatch construction.

* * * * *